United States Patent
Mincu et al.

(10) Patent No.: US 11,649,765 B2
(45) Date of Patent: May 16, 2023

(54) METHOD FOR OPERATING AN AIR INTAKE OF A TURBOJET ENGINE NACELLE DURING A THRUST PHASE AND DURING A REVERSE THRUST PHASE

(71) Applicant: SAFRAN AIRCRAFT ENGINES, Paris (FR)

(72) Inventors: Daniel-Ciprian Mincu, Moissy-Cramayel (FR); Laurent Louis Robert Baudoin, Moissy-Cramayel (FR); Nicolas Joseph Sirvin, Moissy-Cramayel (FR); Jagoda Alina Worotynska, Moissy-Cramayel (FR); Frédéric Dautreppe, Moissy-Cramayel (FR); Caroline Marie Frantz, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 43 days.

(21) Appl. No.: 17/600,076

(22) PCT Filed: Apr. 8, 2020

(86) PCT No.: PCT/EP2020/060060
§ 371 (c)(1),
(2) Date: Sep. 29, 2021

(87) PCT Pub. No.: WO2020/212232
PCT Pub. Date: Oct. 22, 2020

(65) Prior Publication Data
US 2022/0186663 A1  Jun. 16, 2022

(30) Foreign Application Priority Data

Apr. 17, 2019  (FR) ...................................... 1904096

(51) Int. Cl.
*F02C 7/042* (2006.01)
*F02K 1/70* (2006.01)
*F02K 1/66* (2006.01)

(52) U.S. Cl.
CPC ................ *F02C 7/042* (2013.01); *F02K 1/70* (2013.01); *F02K 1/66* (2013.01); *F05D 2220/323* (2013.01); *F05D 2300/501* (2013.01)

(58) Field of Classification Search
CPC .. F02C 7/04; F02C 7/042; F02K 1/645; F02K 1/66; F02K 1/70; F05D 2220/323; F05D 2300/501
See application file for complete search history.

(56) References Cited

U.S. PATENT DOCUMENTS 2,948,111 A * 8/1960 Nelson .................... F02C 7/042
137/15.1
3,611,724 A * 10/1971 Kutney ................... F02C 7/042
137/15.1

(Continued)

FOREIGN PATENT DOCUMENTS

| DE | 4134051 A1 | 4/1993 |
| GB | 1565212 A | 4/1980 |

OTHER PUBLICATIONS

Search Report from the French Intellectual Property Office on corresponding FR application (FR1904096) dated Dec. 2, 2019.

(Continued)

*Primary Examiner* — Steven M Sutherland
(74) *Attorney, Agent, or Firm* — KOS IP Law LLP (57) ABSTRACT

Method for using an air intake of a turbojet engine nacelle comprising at least one elastically deformable portion, at least one connecting member mounted in an annular cavity integrally with the elastically deformable portion, and at least one controllable displacement member, in which method: during a thrust phase of the turbojet engine, the controllable displacement member moves the connecting member into a first position in which the elastically deformable portion of the air intake lip has an aerodynamic profile, and during a thrust reversal phase of the turbojet engine the (Continued)

controllable displacement member moves the connecting member into a second position in which the elastically deformable portion of the air intake lip has an irregular profile so as to allow a release of the reverse air flow from the elastically deformable portion.

9 Claims, 8 Drawing Sheets

(56) References Cited

U.S. PATENT DOCUMENTS

| | | | | |
|---|---|---|---|---|
| 3,618,699 | A * | 11/1971 | Evans | F02C 7/045 |
| | | | | 137/15.1 |
| 2005/0274103 | A1* | 12/2005 | Prasad | B64D 33/02 |
| | | | | 137/15.1 |
| 2008/0310956 | A1* | 12/2008 | Jain | B64D 33/02 |
| | | | | 415/200 |
| 2009/0008508 | A1* | 1/2009 | Jain | F02K 3/06 |
| | | | | 137/15.2 |
| 2013/0170950 | A1 | 7/2013 | Jain et al. | |
| 2014/0127001 | A1* | 5/2014 | Todorovic | B64D 29/00 |
| | | | | 415/127 |
| 2018/0354639 | A1* | 12/2018 | Berens | F02C 7/042 |

OTHER PUBLICATIONS

International Search Report and Written Opinion on corresponding PCT application (PCT/EP2020/060060) from International Searching Authority (EPO) dated Jun. 2, 2020.

* cited by examiner

METHOD FOR OPERATING AN AIR INTAKE OF A TURBOJET ENGINE NACELLE DURING A THRUST PHASE AND DURING A REVERSE THRUST PHASE

TECHNICAL FIELD

The present invention relates to the field of aircraft turbojet engines and is more particularly directed to an air intake of an aircraft turbojet engine nacelle.

In a known manner, an aircraft comprises one or more turbojet engines to enable its propulsion by acceleration of an air flow that circulates from upstream to downstream in the turbojet engine.

Figure 1:
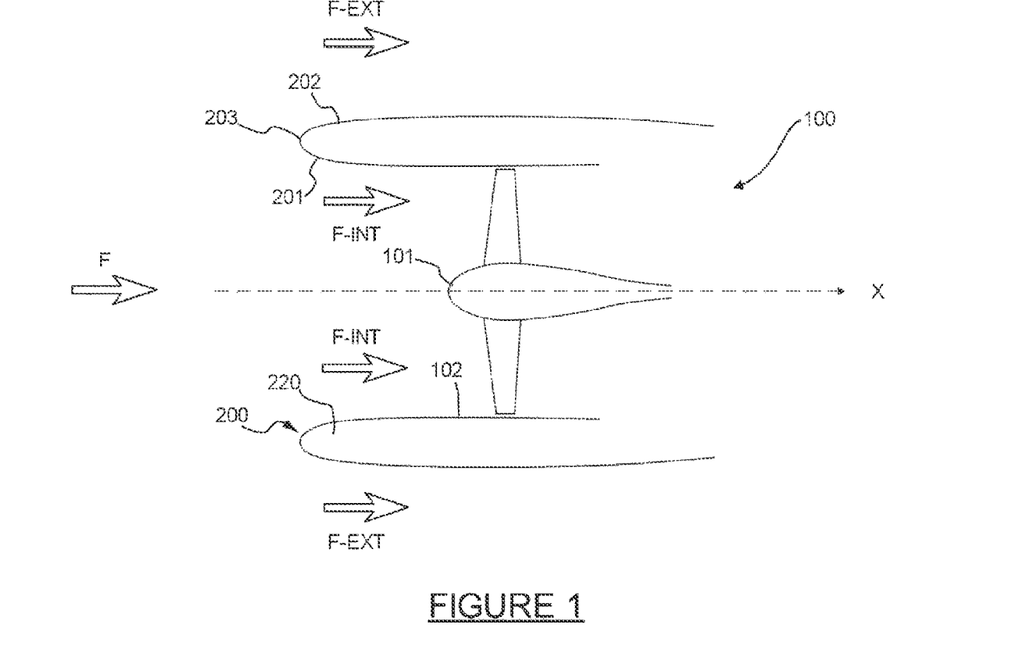
FIG. 1 is a schematic representation in a longitudinal cross-section view of a turbojet engine nacelle during a thrust phase, according to prior art.

With reference to FIG. 1, a turbojet engine 100 is represented, extending along an axis X and comprising a fan 101 rotatably mounted about axis X in an external shell 102 in order to accelerate, during a thrust phase of the turbojet engine 100, an air flow circulating from upstream to downstream in the turbojet engine 100, referred to as the internal air flow F-INT. Hereinafter, the terms "upstream" and "downstream" are defined with respect to the circulation of the internal air flow F-INT.

In known manner, the turbojet engine 100 comprises a nacelle comprising, at its upstream end, an air intake 200 comprising an internal wall 201 pointing to axis X and an external wall 202 opposite to the internal wall 201. The walls 201, 202 are connected by an air intake lip 203 which comprises a leading edge so as to form an annular cavity 220. The air intake 200 has an aerodynamic profile that separates an upstream air flow F into the internal air flow F-INT guided by the internal wall 201 and an external air flow F-EXT guided by the external wall 202. Hereinafter, the terms "internal" and "external" are defined radially with respect to axis X of the turbojet engine 100.

In order to reduce the braking distance of an aircraft, especially during landing, it is known to integrate in a nacelle a thrust reversal system for modifying the orientation of the air flow at the exhaust so as to perform a thrust reversal. In a known way, a thrust reversal phase is carried out by opening traps/grilles in the secondary stream, downstream of the straighteners, in order to lead the air flows radially outwardly.

For a high bypass ratio turbojet, the nacelle has a large diameter and it is not desired to integrate a conventional thrust reversal system since this would be significantly detrimental to the weight, overall size and drag of the turbojet engine.

Another solution to enable thrust reversal is to provide a variable pitch fan, or VPF, so as to enable the air flow circulating in the secondary stream of a turbojet engine to be reversed by modifying the pitch of the fan vanes and thus creating a reverse thrust enabling the aircraft to be decelerated during landing.

Figure 2:
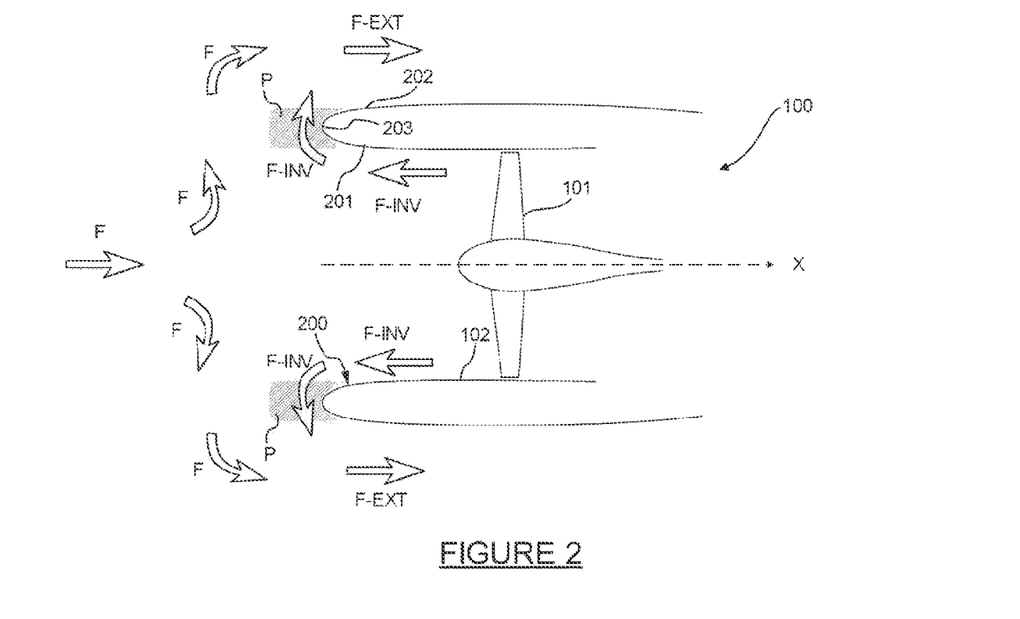
FIG. 2 is a schematic representation in a longitudinal cross-section view of a turbojet engine nacelle during a thrust reversal phase, according to prior art.

With reference to FIG. 2, during a thrust reversal phase, a reverse air flow F-INV circulates from downstream to upstream in the turbojet engine 100, that is, inversely to the internal air flow F-INT of FIG. 1. More precisely, the reverse air flow F-INV circulates in the vicinity of the external shell 102. The reverse air flow F-INV is guided upstream by the internal wall 201 in a direction substantially axial to axis X. This reverse air flow F-INV then opposes the upstream air flow F, allowing for thrust reversal.

In practice, as illustrated in FIG. 2, part of the reverse air flow F-INV bypasses the aerodynamic profile of the air intake 200 in a substantially radial direction, which leads to the occurrence of a zone of local depression P in the vicinity of the air intake lip 203. Such a local depression P generates an upstream suction, that is, a force that opposes the reverse thrust. In practice, this phenomenon reduces the performance of the reverse thrust phase very significantly.

The invention thus aims at reducing this phenomenon in order to increase the performance of the turbojet engine during a thrust reversal phase without affecting the performance of said aircraft during a thrust phase, that is when the flow is not reversed.

A deformable air intake during takeoff that does not promote a thrust reversal phase is known in prior art from patent application US2013/0170950.

In the remote field of hovercraft, a propeller mounted in a fairing whose upstream end is deformable by virtue of an inflatable member is also known from patent application GB1565212A. A spring keeps the inflatable member in a retracted position. The inflatable member is also fed by a pressurized air conduit to inflate it.

SUMMARY

The invention relates to a method for operating an air intake of an aircraft turbojet engine nacelle extending along an axis X oriented from upstream to downstream wherein an internal air flow circulates from upstream to downstream during a thrust phase and a reverse air flow from downstream to upstream during a thrust reversal phase, the air intake circumferentially extending about axis X and comprising an internal wall pointing to axis X, and configured to guide the internal air flow and the reverse air flow, and an external wall, opposite to the internal wall, and configured to guide an external air flow, the internal wall and the external wall being connected to each other by an air intake lip so as to form an annular cavity, the air intake lip comprising at least one elastically deformable portion, the air intake comprising at least one connection member, mounted in the annular cavity integral with the elastically deformable portion and at least one controllable moving member configured to move the connection member, method wherein:

during a thrust phase of the turbojet engine, the controllable moving member moves the connection member into a first position, in which the elastically deformable portion of the air intake lip comprises an aerodynamic profile so as to guide the internal air flow on the internal wall in order to promote a thrust phase, and during a thrust reversal phase of the turbojet engine, the controllable moving member moves the connection member into a second position, in which the elastically deformable portion of the air intake lip comprises an irregular profile so as to allow for a separation of the reverse air flow from the elastically deformable portion.

By virtue of the invention, the air intake lip is elastically deformed to allow for no reduction in the performance of the reverse thrust phase. Such a deformation is aerodynamically advantageous and avoids the need for a heavy and large overall size thrust reversal system according to prior art.

In other words, the controllable moving member is connected to the connection member. The connection member is connected to the elastically deformable portion of the lip. Thus, as the connection member moves, the elastically deformable portion moves therewith. Preferably, the moving member applies a mechanical force by pressing or pulling on the elastically deformable portion. Preferably, the moving member and the elastically deformable portion are integral with each other in each phase.

Preferably, the elastically deformable portion has a rigidity that prevents it from being inflated.

According to one aspect of the invention, the air intake lip comprises a plurality of elastically deformable portions distributed at the circumference about axis X of the air intake in order to reduce drag.

According to one aspect of the invention, the air intake lip comprises a single elastically deformable portion circumferentially extending about axis X ensuring a separation of the homogeneous reverse air flow over the entire circumference of the air intake lip.

According to one aspect of the invention, the connection member is positioned downstream of the upstream end of the air intake lip so as to deform the internal wall or the external wall.

Preferably, the connection member is radially internal to the upstream end of the air intake lip so as to disturb the reverse air flow circulating on the internal wall.

According to one aspect of the invention, the air intake lip comprises a fixed envelope and the elastically deformable portion is connected to the fixed envelope.

According to one aspect of the invention, preferably, the connection member is mounted integral substantially in the center of the elastically deformable portion. Thus, this allows for maximum amplitude of deformation. In this example, the elastically deformable portion comprises a length defined in a longitudinal cross-sectional plane, the movable connection member is spaced from the center of the elastically deformable portion by a distance less than 30% of the total length of the elastically deformable portion.

According to one aspect of the invention, the controllable moving member is configured to move the connection member inwardly of the annular cavity in order to form a concave portion in the air intake lip in the second position. Such an irregular air intake lip helps to promote optimal separation of the air flow. Preferably, the concavity points upstream so as to avoid any local depression at the air intake lip. Preferably, the concavity points radially inwardly so as to promote a separation of the reverse air flow circulating on the internal wall.

According to one aspect of the invention, the controllable moving member is configured to move the connection member outwardly of the annular cavity in order to form a convex portion in the air intake in the second position. Preferably, the convex portion forms a portion of reduced thickness at the air intake lip or alternatively a boss projectingly extending radially inwardly or radially outwardly.

The invention also relates to an air intake of an aircraft turbojet engine nacelle extending along an axis X oriented from upstream to downstream wherein an internal air flow circulates from upstream to downstream during a thrust phase and a reverse air flow from downstream to upstream during a thrust reversal phase, the air intake circumferentially extending about axis X and comprising an internal wall pointing to axis X and configured to guide the internal air flow and the reverse air flow, and an external wall, opposite to the internal wall, and configured to guide an external air flow, the internal wall and the external wall being connected together by an air intake lip so as to form an annular cavity.

The invention is remarkable in that, with the air intake lip comprising at least one elastically deformable portion, the air intake comprises at least one connection member, mounted in the annular cavity integral with the elastically deformable portion, and at least one controllable moving member configured to move the connection member between:

- a first position, in which the elastically deformable portion of the air intake lip has an aerodynamic profile so as to guide the internal air flow onto the internal wall to promote a thrust phase, and
- a second position, in which the elastically deformable portion of the air intake lip has an irregular profile so as to allow separation of the reverse air flow from the elastically deformable portion to promote a thrust reversal phase.

The invention also relates to an aircraft turbojet engine extending along an axis X oriented from upstream to downstream wherein an internal air flow circulates from upstream to downstream during a thrust phase and a reverse air flow from downstream to upstream during a thrust reversal phase, said turbojet engine comprising a fan configured to perform a thrust reversal and a nacelle comprising an air intake, as previously set forth, so as to promote said thrust reversal.

BRIEF DESCRIPTION OF THE DRAWINGS

The invention will be better understood upon reading the following description, which is given solely by way of example, and refers to the appended drawings given as non-limiting examples, in which identical references are given to similar objects and in which:

FIG. 7A and

FIG. 8A and

FIG. 9A and

FIG. 10A,

FIG. 10B and

It should be noted that the figures set out the invention in detail to implement the invention, said figures may of course be used to further define the invention where appropriate.

DETAILED DESCRIPTION

Figure 3:
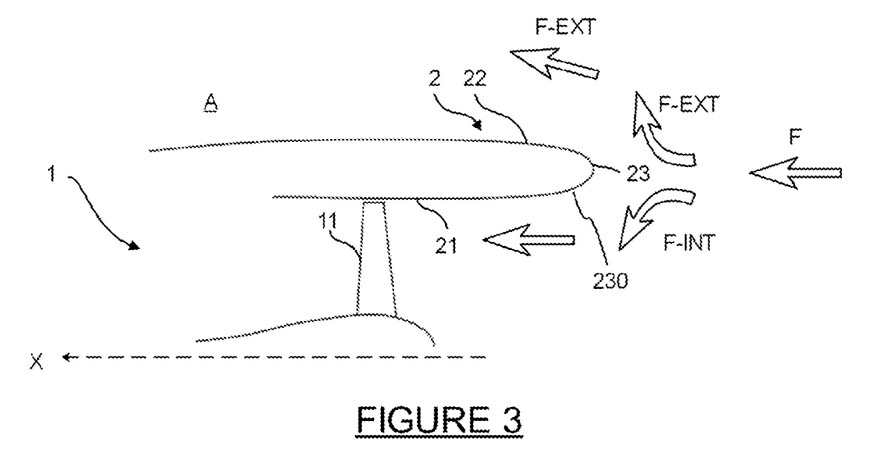
FIG. 3 is a schematic representation in a longitudinal cross-section view of a turbojet engine nacelle during a thrust phase, according to the invention.
Figure 4:
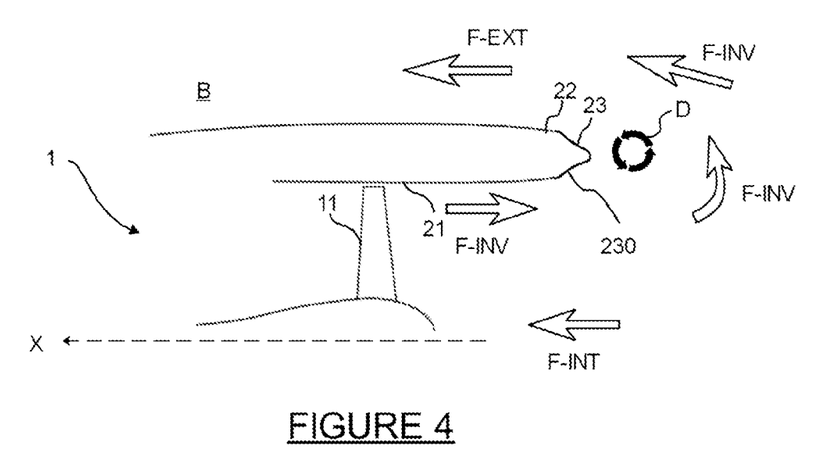
FIG. 4 is a schematic representation in a longitudinal cross-section view of a turbojet engine nacelle during a thrust reversal phase, according to the invention.

With reference to FIGS. 3 and 4, a turbojet engine 1 according to the invention is represented, extending along an axis X oriented from upstream to downstream and comprising a fan 11 rotatably mounted about axis X in an external shell 12 defining an air stream. In a known manner, the fan 11 is configured, during a thrust phase, to accelerate an air flow circulating from upstream to downstream in the turbojet engine 1, known as the internal air flow F-INT (FIG. 3), and during a thrust reversal phase, to accelerate an air flow circulating from downstream to upstream in the turbojet engine 1, known as the reverse air flow F-INV (FIG. 4). In practice, the reverse air flow F-INV circulates from downstream to upstream in a radially external portion of the air stream, in particular, over ⅓ of the air stream radius. An internal air flow F-INT always circulates from upstream to downstream in a radially internal portion of the air stream, in particular, over ⅔ of the air stream radius. The internal air flow F-INT ensures a sufficient flow rate to avoid any pumping phenomenon of the turbojet engine.

As illustrated in FIG. 3, the turbojet engine 1 comprises a nacelle which comprises at its upstream end an air intake 2 circumferentially extending about axis X and comprising an internal wall 21, pointing to axis X and configured to guide the internal air flow F-INT and the reverse air flow F-INV, and an external wall 22, opposite to the internal wall 21, and configured to guide an external air flow F-EXT. The walls 21, 22 are connected by an air intake lip 23 comprising a leading edge. The walls 21, 22 and the air intake lip 23 form an annular cavity 20 in which a sound attenuation device or a de-icing device can be mounted especially.

In this example, the turbojet engine 1 comprises thrust reversing means, in particular, a variable pitch fan 11, or VPF, for reversing the air flow circulating in the turbojet engine 1 and thus creating a reverse thrust allowing the aircraft to be decelerated during landing or upon performing other maneuvers.

According to the invention, with reference to FIGS. 3 and 4, the air intake lip 23 comprises at least one elastically deformable portion 230 which, during a thrust phase, has an aerodynamic profile so as to guide the internal air flow F-INT on the internal wall 21 to promote thrust (first position A), during a thrust reversal phase, has an irregular profile so as to allow separation of the reverse air flow from the elastically deformable portion to promote reverse thrust (second position B).

The elastically deformable portion 230 may be made of a deformable material, for example, a polymeric or organic material. Preferably, the elastically deformable portion 230 is associated with scales, preferably overlapping each other, in order to make the membrane more rigid.

According to one aspect of the invention, the elastically deformable portion 230 may comprise one or more rigid elemental parts connected by one or more flexible elemental parts so as to form a deformable assembly.

Thus, the air intake lip 23 deforms in an advantageous manner in order to fulfill two different and opposite roles during a thrust phase and during a thrust reversal phase. In the first position A, the elastically deformable portion 230 does not affect the aerodynamic performance of the air intake lip 23. The thrust phase is thus optimal.

Following its movement, in the second position B, the air intake lip 23 is modified and no longer has an aerodynamic profile, which makes it possible to achieve a separation D of the reverse air flow F-INV. In other words, the whole of the reverse air flow F-INV is guided so as to circulate in a substantially axial direction with respect to axis X in order to oppose an upstream air flow F, originating the thrust reversal. This makes it possible to reduce the local depression P set forth in prior art which reduces the performance of the thrust reversal phase. An air intake lip 23 having an irregular profile promotes separation D unlike an air intake lip 23 having an aerodynamic profile.

Figure 5:
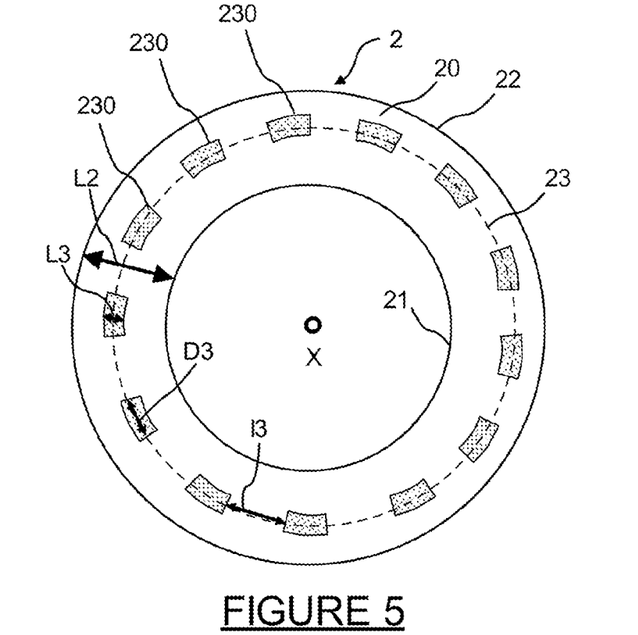
FIG. 5 is a schematic representation in a transverse cross-section view of an air intake comprising a row of elastically deformable portions on the air intake lip.

With reference to FIG. 5, an air intake lip 23 is represented, comprising a plurality of elastically deformable portions 230 that are distributed at the circumference of the air intake 2 about axis X so as to allow for an improved thrust reversal phase homogeneously over the circumference of the air intake 2. Preferably, with reference to FIG. 5, the azimuthal length D3 of an elastically deformable portion 230 is between 10° and 25°. Preferably, the azimuthal spacing 13 between two consecutive elastically deformable portions 230 is between 0° and 5. Preferably, the number of elastically deformable portions 230 is large enough to allow for a separation D over the entire circumference of the air intake 2 and small enough to reduce weight and drag.

Preferably, the elastically deformable portions 230 are organized in rows, with each row comprising a plurality of elastically deformable portions 230 positioned at the same radial distance from axis X. By way of example, a single row is represented in FIG. 5, but obviously the number of rows could be greater. The use of several rows, in particular staggeredly arranged with respect to each other, allows for a substantially continuous deflection along the circumference of the air intake 2 while using elastically deformable portions 230 spaced apart from each other that are simpler to maintain.

Preferably, with reference to FIG. 5, in the first position A, the ratio L3/L2, where parameter L3 is the radial thickness of an elastically deformable portion 230 and parameter L2 is the radial thickness of the air intake 2, is between 0.1 and 0.5.

Figure 6:
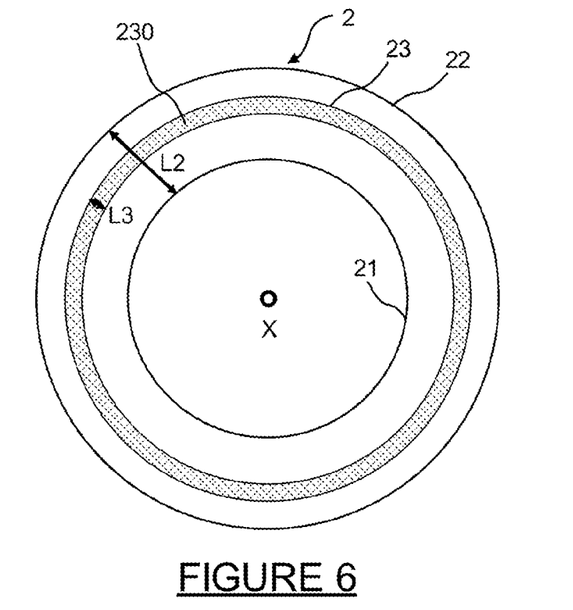
FIG. 6 is a schematic representation in a transverse cross-section view of an air intake comprising a single circumferential elastically deformable portion on the air intake lip.

Alternatively, with reference to FIG. 6, the air intake 2 comprises a single elastically deformable portion 230 circumferentially extending about axis X. Such an elastically deformable portion 230 provides a deflection during the thrust reversal phase at the circumference of the air intake 2, wherein the deflection may be homogeneous (uniform deflection) or heterogeneous (different degree of deflection at the circumference).

Figure 10A:
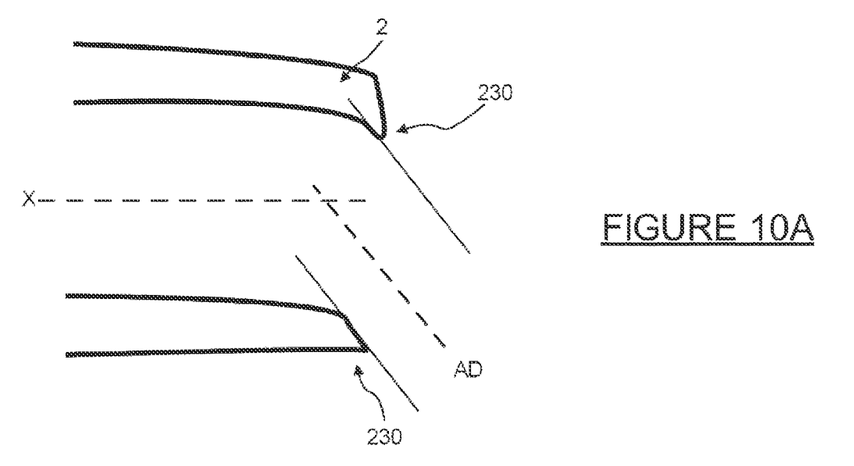
Figure 10B:
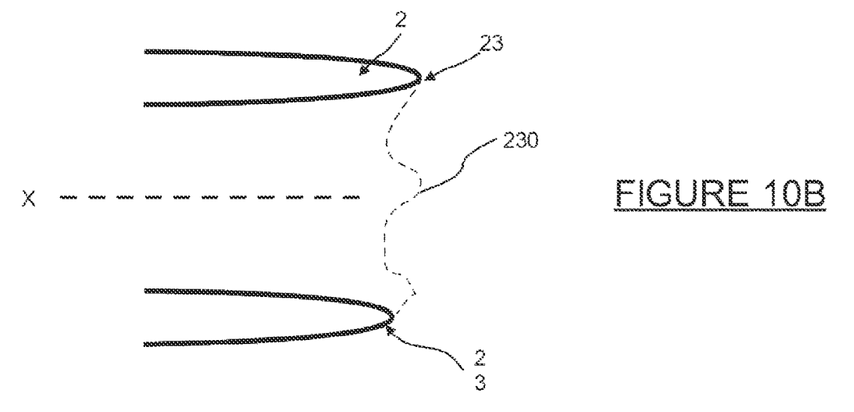
Figure 10C:
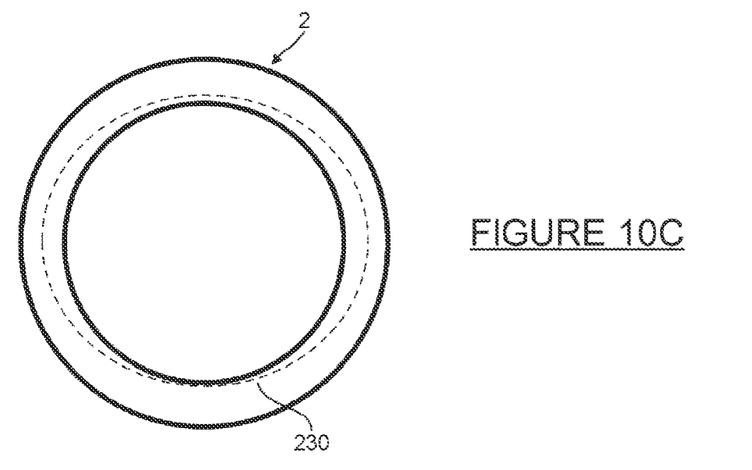
FIG. 10C are schematic representations of deformations of the air intake for heterogeneous deflection at the circumference of the air intake.

As an example of heterogeneous deflection, the elastically deformable portions 230 may be oriented in different directions at the circumference of the air intake 2 so as to form a deformed lip 23 oriented along a predetermined deformation axis AD as illustrated in FIG. 10A. Alternatively, the elastically deformable portions 230 may extend to different projecting lengths at the circumference of the air intake 2 as illustrated in FIG. 10B. Alternatively, the elastically deformable portions 230 may together form a peripheral belt of elliptical, in particular ovoid, shape in a plane transverse to axis X as illustrated in FIG. 10C. A heterogeneous deflection allows the reverse air flow to be guided taking account of the environment of the nacelle.

The invention will be better understood upon describing the different embodiments. The different aspects of the invention are described hereinafter according to several embodiments, set forth successively and solely by way of example. It goes without saying that the invention is not limited to these embodiments but encompasses any possible combination of the various technical characteristics of the embodiments set forth.

Figure 7A:
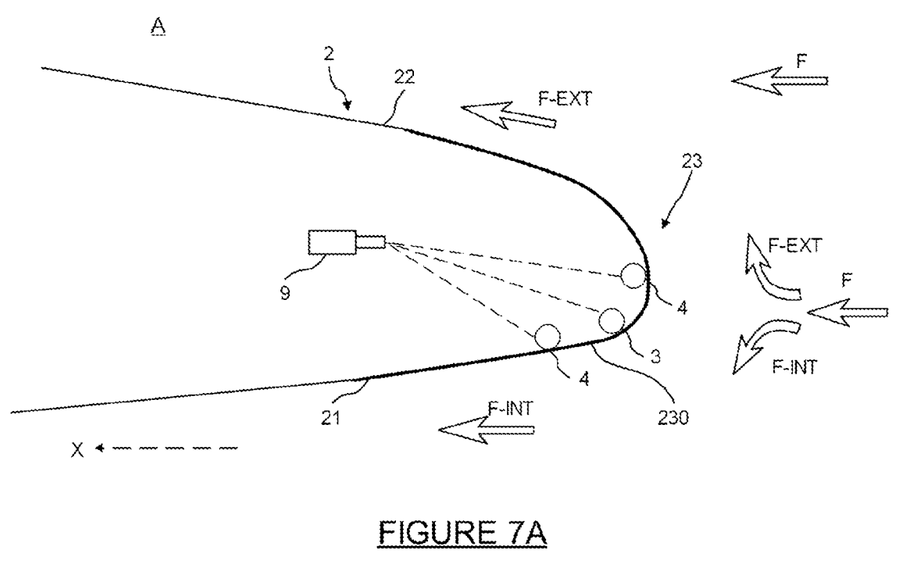
Figure 7B:
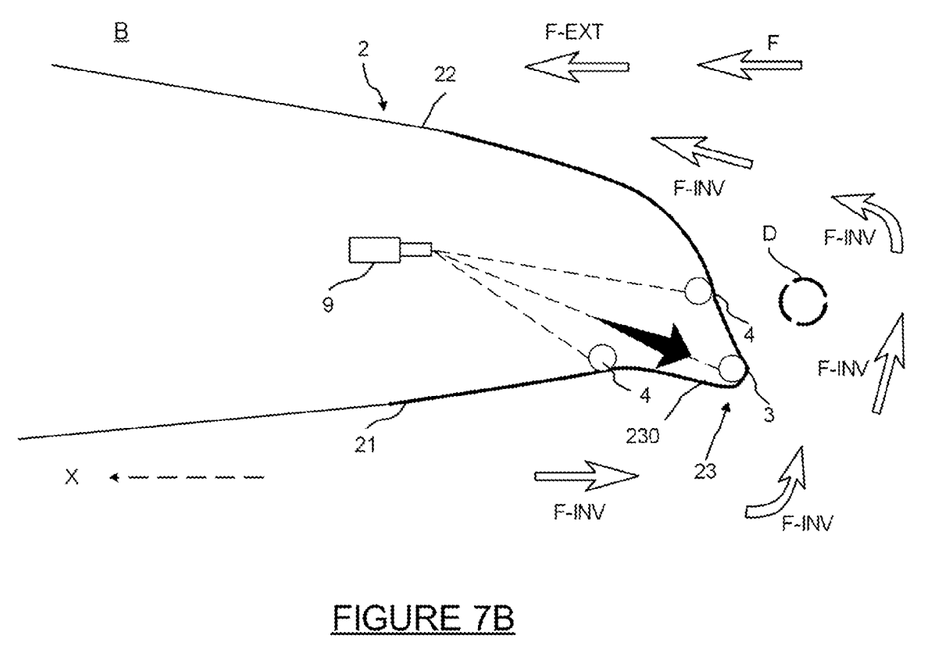
FIG. 7B are schematic representations in a longitudinal cross-section view of an air intake comprising an elastically deformable portion at a first aerodynamic position and a second position in which the air intake lip is thinned.

According to a first embodiment illustrated in FIGS. 7A and 7B, an air intake 2 is represented that comprises an air intake lip 23 that comprises an elastically deformable portion 230. In this example, the air intake 3 comprises three members 3, 4 integral with the elastically deformable portion 230: two fixed members 4 and one movable member 3. The movable connection member 3 allows the elastically deformable portion 230 to be precisely deformed between the fixed members 4.

In this first embodiment, the air intake lip 23 comprises a first fixed connection member 4 positioned at the upstream end of the air intake lip 23 and a second fixed connection member 4 positioned at the internal wall 21 as illustrated in FIG. 7A. The movable connection member 3 is positioned between the two fixed connection members 4 as illustrated in FIG. 7A. Preferably, the movable connection member 3 is positioned substantially in the center of the elastically deformable portion 230. In this example, since the elastically deformable portion 230 comprises a length defined in a longitudinal cross-sectional plane, the movable connection member 3 is spaced from the center of the elastically deformable portion 230 by a distance less than 10% of the total length of the elastically deformable portion 230.

In this example, the air intake 2 comprises a controllable moving member 9 in order to translationally move the movable connection member 3 from the first position A to the second position B. By way of example, this controllable moving member 9 is in the form of a pneumatic, hydraulic, electric or other actuator in order to allow a movement as a result of receiving a control command from a calculator. A pneumatic actuator is preferred as it is easier to integrate. Preferably, the controllable moving member 9 also allows the elastically deformable portion 3 to be translationally moved from the second position B to the first position A. The air intake 2 may comprise one or more controllable moving members 9.

Still referring to FIGS. 7A and 7B, the controllable moving member 9 allows the movable connection member 3 to be moved upstream so that the elastically deformable portion 230 projectingly extends and reduces the circulation diameter of the reverse air flow F-INV. In the second position B, as illustrated in FIG. 7B, the air intake lip 23 is thinner and causes separation D of the reverse air flow F-INV as it circulates from the internal wall 21 to the external wall 22. Because of its separation D, the reverse air flow F-INV does not intimately follow the shape of the air intake lip 23 and is spaced apart from it, thereby reducing the formation of a local depression as in prior art. In other words, the performance during the thrust reversal phase is increased.

In FIGS. 7A-7B, the fixed members 4 are connected to the controllable moving member 9 and allow the movement of the movable connection member 3. The controllable moving member 9 allows the fixed members 4 to be held stationary during the movement of the movable connection member 3, thereby controlling the deformation of the elastically deformable portion 3. Of course, the fixed members 4 could be connected to no controllable moving members 9 or connected to different controllable moving members 9.

Figure 7C:
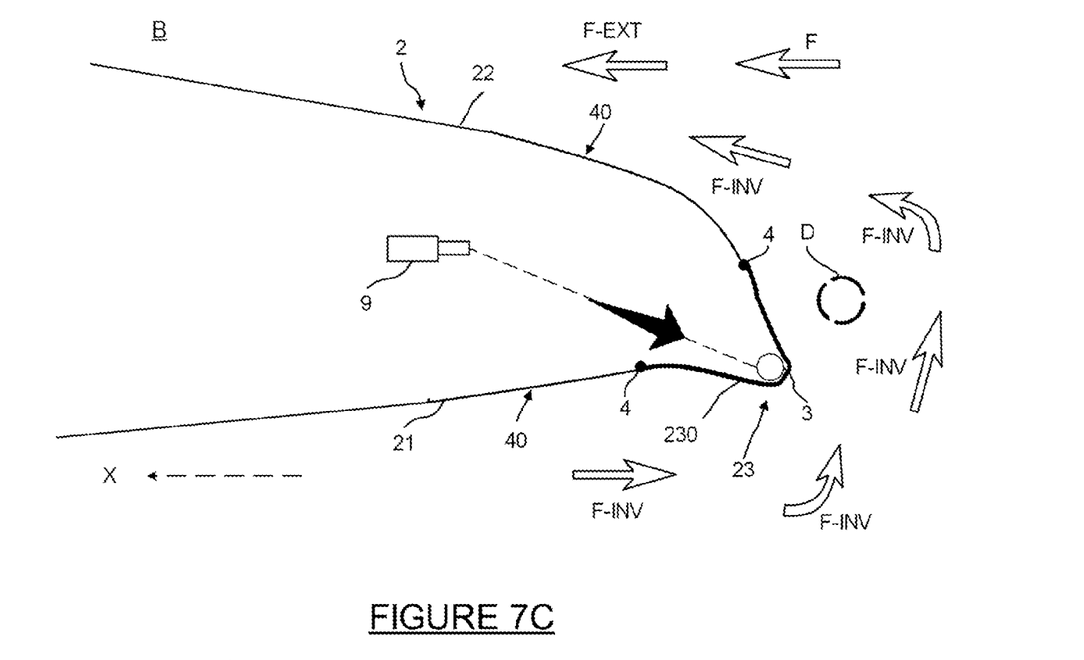
FIG. 7C is a schematic longitudinal cross-sectional representation of an air intake comprising an elastically deformable portion comprising a rigid envelope at a second position in which the air intake lip is thinned.

With reference to FIG. 7C, the fixed members 4 are in the form of a fixed envelope 40. In other words, the fixed members 4 form the interface between the fixed envelope 40 and the elastically deformable portion 230.

Figure 8A:
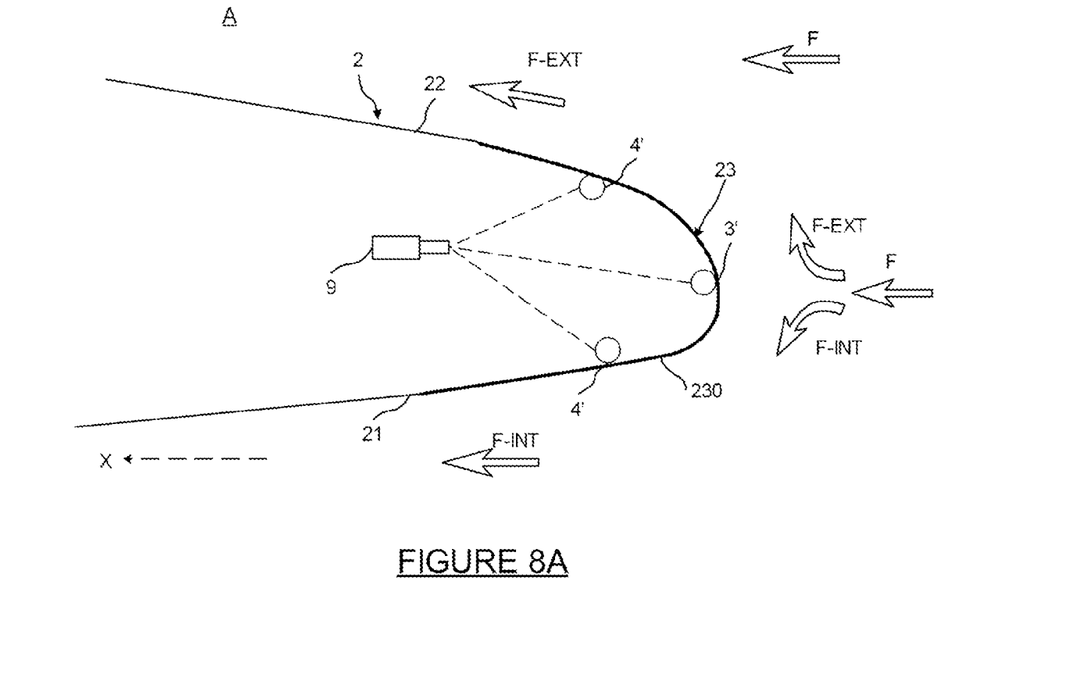
Figure 8B:
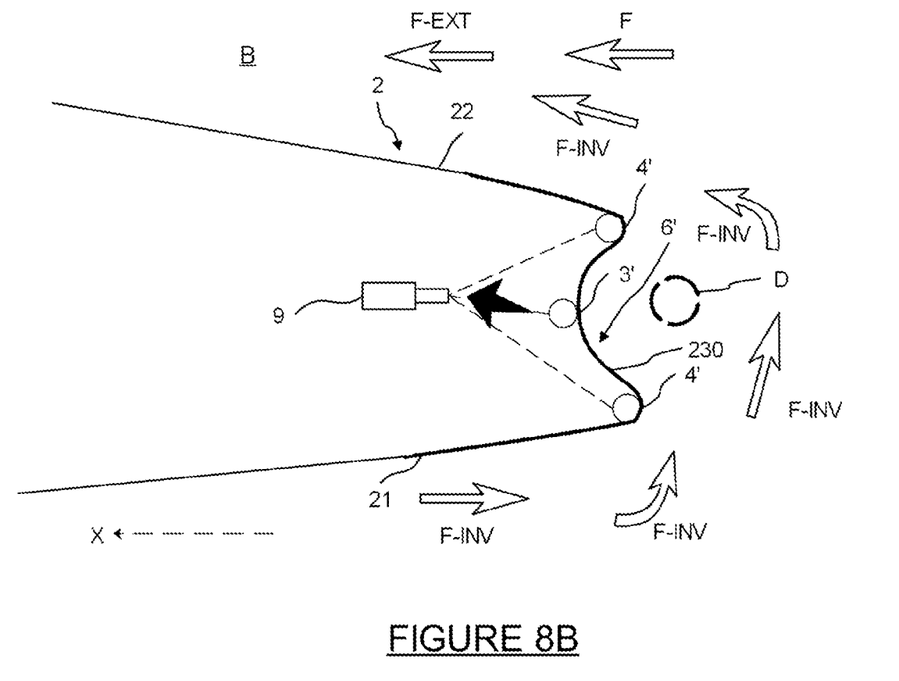
FIG. 8B are schematic longitudinal sectional representations of an air intake comprising an elastically deformable portion at a first aerodynamic position and a second position in which the air intake lip comprises a concavity pointing upstream.

According to a second embodiment illustrated in FIGS. 8A and 8B, the air intake lip 23 comprises a first fixed connection member 4' positioned at the external wall 22 and a second fixed connection member 4' positioned at the internal wall 21 as illustrated in FIG. 8A. The movable connection member 3' is positioned at the upstream end of the air intake lip 23 between the two fixed connection members 4' as illustrated in FIG. 8A.

Analogously to the foregoing, the air intake 2 comprises a controllable moving member 9 in order to translationally move the movable connection member 3' from the first position A to the second position B.

Still referring to FIGS. 8A and 8B, the controllable moving member 9 allows the movable connection member 3' to be moved downstream so that the elastically deformable portion 230 extends backwards so as to form a concave portion 6' in the air intake lip 23 in the second position B. In this embodiment, the concavity points upstream so as to form an irregular air intake lip 23.

In the second position B, as illustrated in FIG. 8B, the air intake lip 23 is deformed and causes separation D of the reverse air flow F-INV as it circulates from the internal wall 21 to the external wall 22. Because of its separation D, the reverse air flow F-INV does not intimately follow the shape of the air intake lip 23 and is spaced apart from it, thereby reducing the formation of a local depression as in prior art. In other words, the performance during the thrust reversal phase is increased.

Figure 9A:
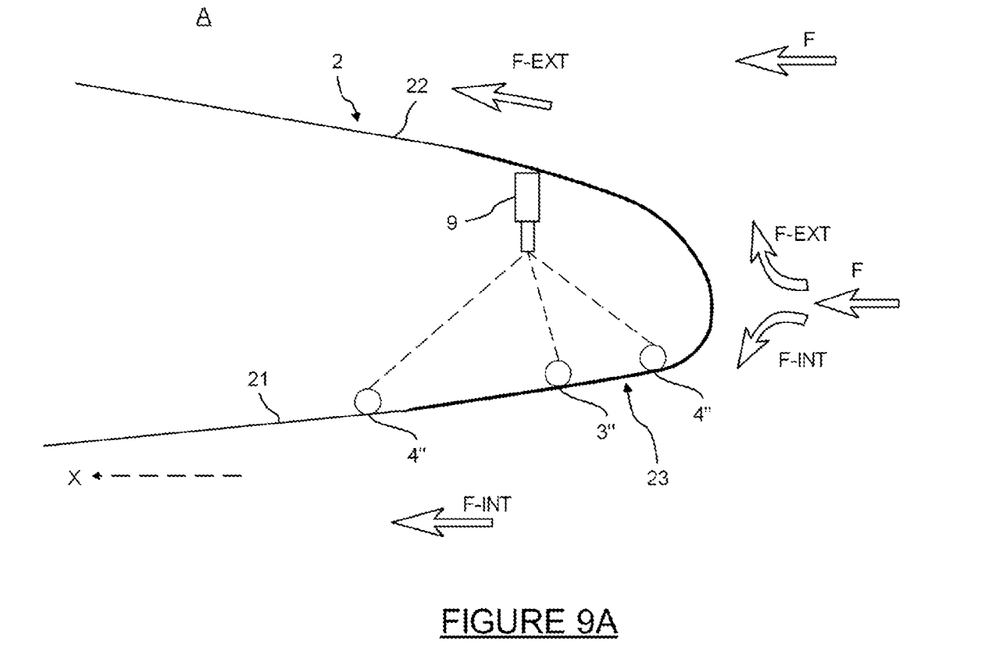
Figure 9B:
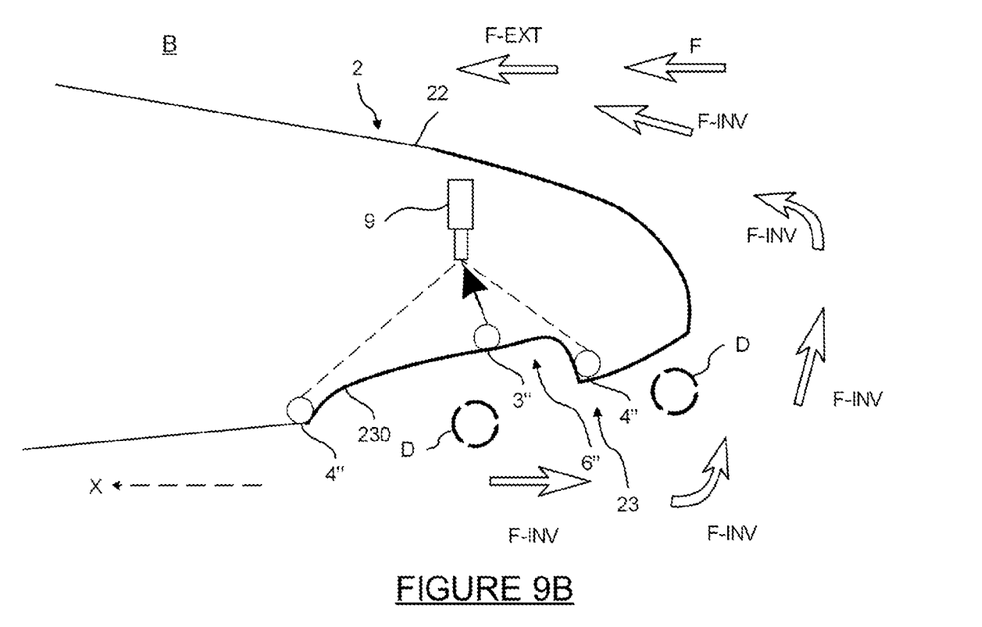
FIG. 9B are schematic representations in a longitudinal cross-section view of an air intake comprising an elastically deformable portion at a first aerodynamic position and a second position in which the air intake lip comprises a concavity pointing radially inwardly.

According to a third embodiment illustrated in FIGS. 9A and 9B, the air intake lip 23 comprises two fixed connection members 4" positioned at a lower part of the air intake lip 23 as illustrated in FIG. 8A. The movable connection member 3" is positioned between both fixed connection members 4" as illustrated in FIG. 9A.

Analogously to the foregoing, the air intake 2 comprises a controllable moving member 9 in order to translationally move the movable connection member 3" from the first position A to the second position B.

Still referring to FIGS. 9A and 9B, the controllable moving member 9 allows the movable connection member 3 to be moved radially outwardly so that the elastically deformable portion 230 extends backwardly so as to form a concave portion 6" in the lower portion of the air intake lip 23 in the second position B. In this embodiment, the concavity points radially inwardly so as to form an air intake lip 23 comprising an irregular internal portion.

In the second position B, as illustrated in FIG. 9B, the air intake lip 23 is deformed and causes separation D of the reverse air flow F-INV as it circulates from the internal wall 21 to the external wall 22. Because of its separation D, the reverse air flow F-INV does not intimately follow the shape of the air intake lip 23 and is spaced apart from it, which avoids any formation of a local depression as in prior art. In other words, the performance of the thrust reversal phase is increased.

Likewise, according to an embodiment not represented, the air intake lip 23 may comprise two fixed connection members positioned at the upper part of the air intake lip 23. The movable connection member is positioned between both fixed connection members. The controllable moving member allows the movable connection member to be moved radially inwardly so that the elastically deformable portion extends backwards to form a concave portion in the upper part of the air intake lip 23 in the second position B. In this embodiment, the concavity points radially outwardly so as to form an air intake lip 23 comprising an irregular external part.

According to another aspect of the invention not represented, the controllable moving member is in the form of an inflatable actuator configured to inflate/deflate the elastically deformable portion from one position to another. Preferably, the inflatable actuator is fed by air taken from the turbojet engine.

A method for operating the air intake 2 according to the invention previously set forth is described hereinafter. For the sake of clarity, the movement of a single elastically deformable portion 230 is set forth, but it is understood that a plurality of elastically deformable portions 230 may be moved concurrently or sequentially.

During a thrust phase, the fan 11 makes it possible to accelerate an internal air flow F-INT that is guided by the air intake 2 having an aerodynamic profile that promotes thrust. The elastically deformable portion 230 is in the first position A during a thrust phase of the turbojet engine 1, so that the air intake 2 has an aerodynamic profile so as to guide the air flow.

During a thrust reversal of said turbojet engine 1, in particular following a change in the pitch of the fan vanes 11, the controllable moving member 9 moves the connection member 3 into a second position B, in which the elastically deformable portion 230 of the air intake lip 23 has an irregular profile in order to allow separation of the reverse air flow F-INV D from the elastically deformable portion 230.

Advantageously, this movement step provides the aircraft with good performance both during a thrust phase, where the internal air flow F-I NT is kept unchanged, and during a thrust reversal phase, where the elastically deformable portion 230 generates a separation D of the reverse air flow F-INV from the internal wall 21.

According to one aspect of the invention, only part of the elastically deformable portions 230 is moved during the movement step to adapt to different operating conditions, in particular, during braking. In addition, the degree of deformation may vary at the circumference of the air intake lip in order to precisely control the thrust reversal phase.

By virtue of the invention, the performance of the turbojet engine 1 is significantly improved during the thrust reversal phase while maintaining the existing performance during the thrust phase. Indeed, the elastically deformable portion 230 generates, in the second position B, separation D of the reverse air flow F-INV from the internal wall 21 allowing the whole reverse air flow F-INV to be oriented in a substantially axial direction opposite to the upstream air flow F, originating the thrust reversal, while generating reduced weight and drag. In the first position A, the air intake 2 advantageously maintains its aerodynamic profile.

The invention claimed is:

1. A method for operating an air intake of an aircraft turbojet engine nacelle extending along an axis X oriented from upstream to downstream in which an internal air flow circulates from upstream to downstream during a thrust phase and a reverse air flow from downstream to upstream during a thrust reversal phase, the air intake circumferentially extending about the axis X and comprising an internal wall pointing to the axis X, and configured to guide the internal air flow and the reverse air flow, and an external wall, opposite to the internal wall, and configured to guide an external air flow, the internal wall and the external wall being connected to each other by an air intake lip so as to form an annular cavity, the air intake lip comprising at least one elastically deformable portion, the air intake comprising at least one connection member, mounted in the annular cavity integral with the at least one elastically deformable portion and at least one controllable moving member connected mechanically to the at least one connection member and configured to move said connection member, method wherein:

during a thrust phase of the turbojet engine, the at least one controllable moving member moves the at least one connection member a first position, in which the at least one elastically deformable portion of the air intake lip comprises an aerodynamic profile so as to guide the internal air flow on the internal wall in order to promote a thrust phase, and during a thrust reversal phase of the turbojet engine, the at least one controllable moving member moves the at least one connection member into a second position, in which the at least one elastically deformable portion of the air intake lip comprises an irregular profile so as to allow a separation of the reverse air flow from the at least one elastically deformable portion.

2. The method according to claim 1, wherein the air intake lip comprises a plurality of elastically deformable portions distributed at the circumference of the air intake about the axis X.

3. The method according to claim 1, wherein the air intake lip comprises a single elastically deformable portion circumferentially extending about the axis X.

4. The method according to claim 1, wherein the at least one connection member is positioned downstream of the upstream end of the air intake lip.

5. The method according to claim 1, wherein the at least one connection member is radially internal to the upstream end of the air intake lip.

6. The method according to claim 1, wherein with the air intake lip comprising a fixed envelope, the at least one elastically deformable portion is connected to the fixed envelope.

7. The method according to claim 1, wherein the at least one connection member is mounted integral substantially in the center of the at least one elastically deformable portion.

8. The method according to claim 1, wherein the at least one controllable moving member is configured to move the at least one connection member inwardly of the annular cavity in order to form a concave portion in the air intake lip in the second position.

9. The method according to claim 1, wherein the at least one controllable moving member is configured to move the at least one connection member outwardly of the annular cavity in order to form a convex portion in the air intake in the second position.

* * * * *